E. L. BLOOD.
PIPE COUPLING.
APPLICATION FILED MAY 15, 1912.

1,045,667.

Patented Nov. 26, 1912.

WITNESSES

INVENTOR
Everett L. Blood
BY
ATTORNEYS

UNITED STATES PATENT OFFICE.

EVERETT L. BLOOD, OF MULBERRY, FLORIDA.

PIPE-COUPLING.

1,045,667.  Specification of Letters Patent.  Patented Nov. 26, 1912.

Application filed May 15, 1912. Serial No. 697,375.

*To all whom it may concern:*

Be it known that I, EVERETT L. BLOOD, a citizen of the United States, and a resident of Mulberry, in the county of Polk, and State of Florida, have invented a new and Improved Pipe-Coupling, of which the following is a full, clear, and exact description.

My invention relates generally to pipe couplings and more particularly it comprehends a flexible coupling especially adapted for use on the suction and discharge sides of pumping devices in order to relieve the pipe line of vibration; the coupling is also adapted for use as a flexible connection in any hydraulic line, pumping water or water and other substances.

The principal object of my invention is to provide a new and improved device of the class described wherein the parts of the coupling by which the flexibility thereof is provided are protected in a greater degree from injury or from contact with the materials passing through the coupling, thereby prolonging the life of the parts and enabling the device to be used with greater efficiency.

Other objects and advantages of the invention will appear as the description thereof proceeds, all of which is particularly pointed out and included in the appended claim.

Reference is to be had to the accompanying drawings forming a part of this specification, in which similar characters of reference denote corresponding parts in all the views, and in which—

Figure 1:
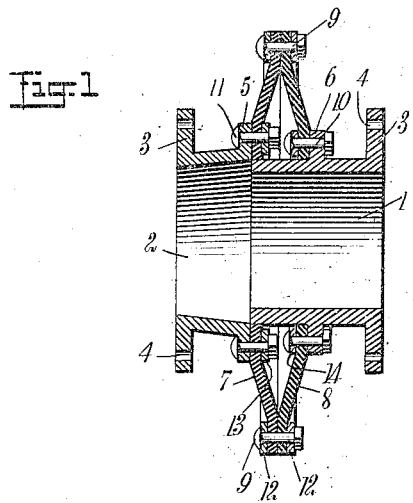
Figure 2:
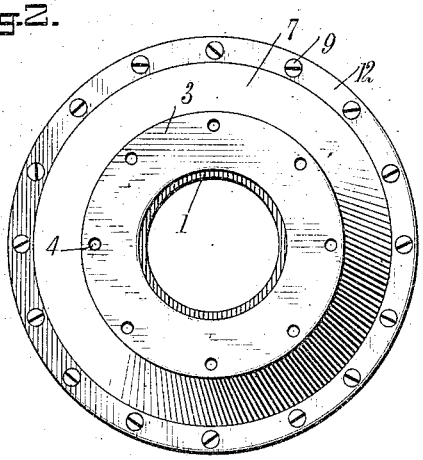

Figure 1 is a vertical sectional view of the coupling; Fig. 2 is an end view thereof.

The coupling is designed to be attached to the adjacent ends of any suitable pipes or connections carried by cylinders or other devices, the size of the parts and the material of which they are made depending on the particular use to which the construction is adapted, variations in such matters being comprehended within the appended claim.

The coupling comprises a plurality of nipples 1, 2, each being provided at one end with a peripheral flange 3, each flange being provided with suitable openings 4 whereby bolts may be used to secure the nipples in position.

The opposite end of the nipple 2 is provided with a peripheral flange 5 having openings passing therethrough; the intermediate portion of the nipple 3 is provided with a shoulder 6 also provided with a number of openings passing therethrough.

Two washers 7, 8, of flexible material and preferably circular in outline, are provided along their outer periphery with a number of registering openings through which bolts and nuts 9 pass, the inner periphery of the washers 7, 8, being provided with openings which register with the openings in the shoulder 6 and the flange 5 whereby suitable bolts or other fastening devices 10, 11, may be passed therethrough in order to tightly grip the parts in position; the engagement between the outer peripheral portions of the washers 7, 8, is enhanced by the use of circular rings 12, placed on the outside of each of the washers, the bolts 9 passing through the rings as well as the washers.

The engagement between the flange 5 and the inner peripheral edge portion of the washer 7 is rendered more efficient by means of a ring 13 bearing against the washer, the inner peripheral edge of the washer 8 being also held in better and more secure position against the shoulder 6 by means of the ring 14 through which the bolts 10 pass.

Referring particularly to Fig. 1 it is to be noted that the shoulder 6 on the nipple 1 is not adjacent the end portion of the nipple; by providing this shoulder intermediate the ends of the nipple I provide a structure wherein the adjacent or meeting ends of the nipples may be more securely held together, and to this end it may be desirable to have the side walls of the nipples tapering, as shown particularly to Fig. 1, whereby movement of one relatively to the other permits the one end portion to be positioned closely adjacent or within the other end portion.

It is also clear that the use of the coupling herein described and claimed prevents contact of the liquid passing therethrough with the flexible elements 7, 8, thereby prolonging the life of the same and protecting them in a greater degree from the injurious effects of such contact.

It is obvious that the use of this coupling in lines of pipe connected with pumps will prevent transmission of vibration throughout the lines of piping, the flexible connection between the lines of piping and the pump taking up or absorbing the vibration.

Having thus described my invention, I claim as new, and desire to secure by Letters Patent:—

A pipe coupling comprising a nipple having a flange at one end thereof, the opening extending through the nipple being tapering, a second nipple having a shoulder thereon intermediate its ends, the second nipple beyond the shoulder being adapted to enter into the said larger open end of the first nipple, a flexible element secured to the flange of the first nipple, another flexible element secured to the shoulder of the second nipple, together with rings engaging the peripheral portions of the said flexible elements, whereby they are held together.

In testimony whereof I have signed my name to this specification in the presence of two subscribing witnesses.

EVERETT L. BLOOD.

Witnesses:
LOUIS SILVERMAN,
J. J. JACKSON.